(12) United States Patent
Ljunggren et al.

(10) Patent No.: US 12,240,745 B2
(45) Date of Patent: Mar. 4, 2025

(54) CONTACTLESS BEVERAGE DISPENSING METHODS

(71) Applicant: PepsiCo, Inc., Purchase, NY (US)

(72) Inventors: Anton Ljunggren, New York, NY (US); Marco Cimatti, New York, NY (US); Martin Eduardo Broen, New York, NY (US); Jacob Michael Cates, Charlottesville, VA (US); Adrian Taylor, Austin, TX (US); Cory Tobin, Austin, TX (US)

(73) Assignee: PepsiCo, Inc., Purchase, NY (US)

( * ) Notice: Subject to any disclaimer, the term of this patent is extended or adjusted under 35 U.S.C. 154(b) by 538 days.

(21) Appl. No.: 17/069,505

(22) Filed: Oct. 13, 2020

(65) Prior Publication Data

US 2022/0112068 A1  Apr. 14, 2022

(51) Int. Cl.
  *B67D 1/08* (2006.01)
  *B67D 1/00* (2006.01)
  *G05B 15/02* (2006.01)

(52) U.S. Cl.
  CPC ......... *B67D 1/0888* (2013.01); *B67D 1/0022* (2013.01); *B67D 1/0074* (2013.01); *G05B 15/02* (2013.01)

(58) Field of Classification Search
  None
  See application file for complete search history.

(56) References Cited

U.S. PATENT DOCUMENTS

| | | | | |
|---|---|---|---|---|
| 3,634,107 A | * | 1/1972 | Cornelius | A47J 31/467 99/275 |
| 3,768,701 A | * | 10/1973 | Leas | B67D 1/0006 141/35 |
| 5,803,320 A | * | 9/1998 | Cutting | B67D 1/0871 222/129.1 |
| 2006/0112831 A1 | * | 6/2006 | Greenwald | A47J 31/56 99/275 |
| 2009/0229471 A1 | * | 9/2009 | Lun | A47J 31/52 99/290 |

(Continued)

OTHER PUBLICATIONS

International Search Report and Written Opinion of the International Searching Authority in International Application No. PCT/US2021/051875, mailed Jan. 21, 2022 (13 pages).

(Continued)

*Primary Examiner* — Bernard G Lindsay
(74) *Attorney, Agent, or Firm* — Sterne, Kessler, Goldstein & Fox P.L.L.C.

(57) ABSTRACT

A method of selecting and dispensing a custom beverage in a contactless manner using a mobile electronic device. The method includes launching a microsite on the mobile electronic device. The method further includes receiving a beverage selection via the microsite on the mobile electronic device, and receiving a selection of a volume of the custom beverage to be dispensed via the microsite. The method further includes generating a QR code via the microsite, wherein the QR code corresponds to the beverage selection and the volume selection and displaying the QR code on a display of the mobile electronic device such that when the QR code is read by a reader of a beverage dispenser, the selected beverage is dispensed in the selected volume based on the QR code.

20 Claims, 14 Drawing Sheets

(56) References Cited

U.S. PATENT DOCUMENTS

| | | | |
|---|---|---|---|
| 2012/0267455 A1* | 10/2012 | Hansen | B05B 15/654 239/547 |
| 2013/0096715 A1* | 4/2013 | Chung | G06Q 30/02 700/233 |
| 2013/0282451 A1 | 10/2013 | Moore et al. | |
| 2014/0196811 A1* | 7/2014 | Ramos, III | G07F 13/065 141/2 |
| 2015/0045947 A1* | 2/2015 | Yau | G06Q 20/3223 700/237 |
| 2015/0125587 A1* | 5/2015 | Asano | A23L 2/56 426/433 |
| 2015/0178721 A1* | 6/2015 | Pandiarajan | G06K 19/06112 705/64 |
| 2016/0287008 A1* | 10/2016 | Barnett | A47J 31/3671 |
| 2016/0363921 A1 | 12/2016 | Martindale et al. | |
| 2016/0364928 A1* | 12/2016 | Woodard | G06Q 10/1095 |
| 2016/0368753 A1 | 12/2016 | Bethuy et al. | |
| 2017/0238753 A1* | 8/2017 | Merali | A47J 31/521 |
| 2017/0287258 A1* | 10/2017 | Gerhard | G07F 9/105 |
| 2017/0293983 A1* | 10/2017 | Long, II | B67D 1/0019 |
| 2018/0168385 A1* | 6/2018 | Boone | G06Q 30/0621 |
| 2018/0215603 A1* | 8/2018 | Hecht | B67D 1/06 |
| 2019/0164237 A1* | 5/2019 | Newman | G06Q 50/12 |
| 2020/0017345 A1 | 1/2020 | Karibandi, Jr. et al. | |
| 2020/0031656 A1* | 1/2020 | Rudick | G06F 3/013 |
| 2020/0231426 A1* | 7/2020 | Edwards | B67D 1/0888 |
| 2021/0371266 A1* | 12/2021 | Connor | G06K 7/10722 |
| 2022/0041425 A1* | 2/2022 | Sankaran | G06Q 20/3223 |

OTHER PUBLICATIONS

Extended European Search Report issued in European Appl. No. 21880762.6, dated Oct. 2, 2024 (11 pages).

* cited by examiner

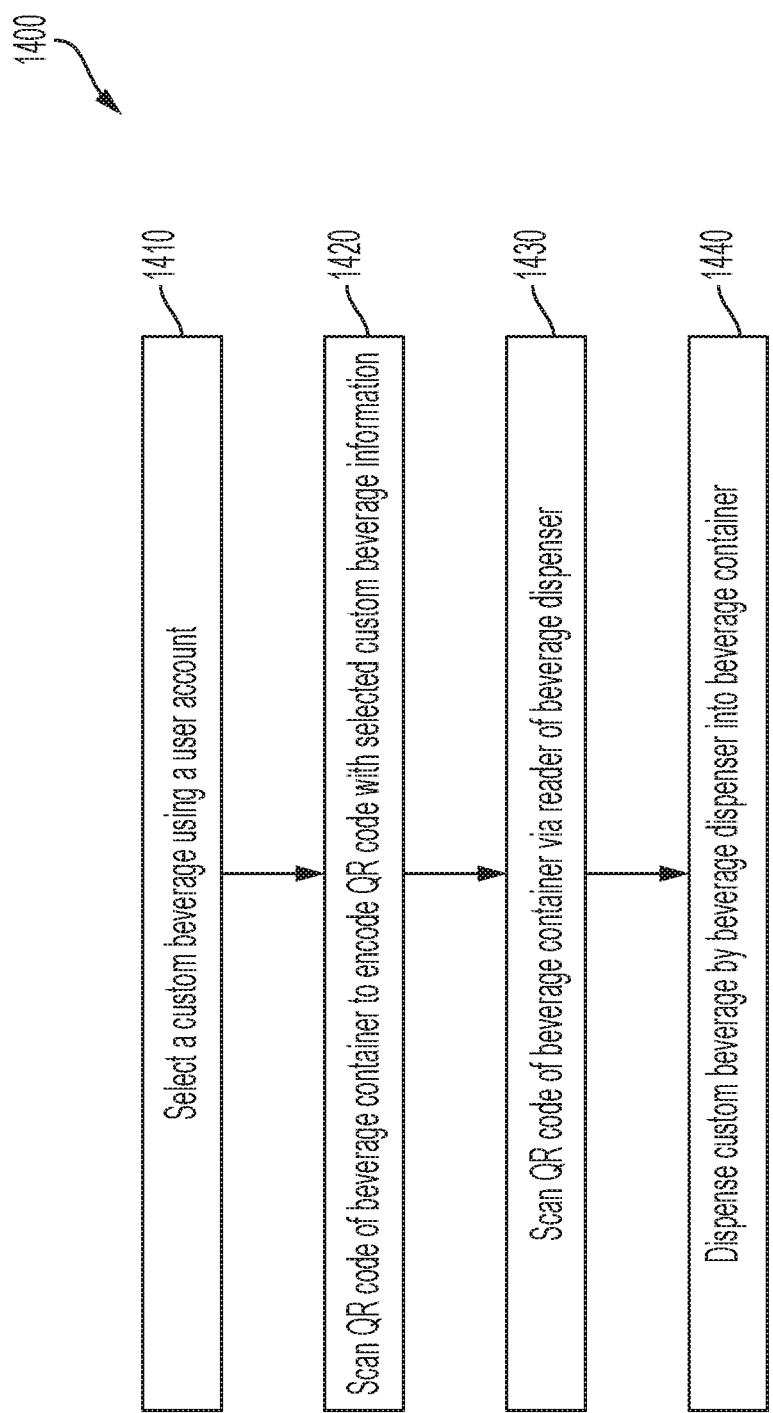

CONTACTLESS BEVERAGE DISPENSING METHODS

FIELD

Embodiments described herein generally relate to a contactless method for selecting and dispensing a custom beverage. Specifically, embodiments described herein relate to a contactless method for dispensing a custom beverage including selecting a custom beverage using a mobile electronic device of the consumer and generating or encoding a QR code with the selected custom beverage to be read by a beverage dispenser.

BACKGROUND

Beverage dispensers may be used to allow consumers to select a beverage and dispense the selected beverage into a container. The beverage dispenser may be a fountain beverage dispenser and may include a variety of beverage options for the user to select. Depending on the type of dispenser, the consumer may press and hold a physical button to dispense a desired amount of a beverage. Some modern beverage dispensers may include a touch screen display for receiving the consumer's beverage selection and for initiating dispensing of the beverage. Such beverage dispensers may include options to add flavorings or make other modifications to the beverage to be dispensed. Beverage dispensers may be designed to enhance the consumer experience by facilitating selection and dispensing of a beverage and to simplify the dispensing operation.

SUMMARY OF THE INVENTION

Some embodiments described herein relate to a method of dispensing a custom beverage from a beverage dispenser in a contactless manner that includes displaying a QR code, by the beverage dispenser, wherein the QR code corresponds to a microsite for selecting a custom beverage, and receiving a selection of a custom beverage and a volume of the custom beverage to be dispensed via the microsite. The method may further include generating, via the microsite, a QR code corresponding to the selected custom beverage and the selected volume, reading the generated QR code by a reader of the beverage dispenser, and dispensing the selected custom beverage in the selected volume based on the QR code.

In any of the various embodiments described herein, receiving the selection of the custom beverage may include receiving a selection of a type of beverage and receiving a selection of a flavoring.

In any of the various embodiments described herein, receiving the selection of the custom beverage may include receiving a selection of a carbonation level of the beverage.

In any of the various embodiments described herein, receiving the selection of the custom beverage may include receiving a selection of a flavoring level of the beverage.

In any of the various embodiments described herein, receiving the selection of the custom beverage may include receiving a selection of a temperature of the beverage.

In any of the various embodiments described herein, receiving the selection of the custom beverage via the microsite may be performed using a mobile electronic device.

In any of the various embodiments described herein, the method may further include displaying in real-time a volume of the custom beverage dispensed while the custom beverage is being dispensed by the beverage dispenser.

In any of the various embodiments described herein, dispensing the custom beverage may occur after a predetermined period of time after reading the QR code via the beverage dispenser.

Some embodiments described herein relate to a method of selecting and dispensing a custom beverage using a mobile electronic device that includes receiving selection of the custom beverage in a user account, wherein receiving selection of the custom beverage comprises receiving selection of a type of beverage and receiving selection of a flavoring. The method may further include storing the custom beverage in the user account, generating a QR code corresponding to the stored custom beverage, and displaying the QR code on the mobile electronic device, wherein when the QR code is read by a reader of a beverage dispenser, the custom beverage is dispensed by the beverage dispenser.

In any of the various embodiments described herein, receiving selection of the custom beverage may include receiving selection of a volume of the custom beverage to be dispensed, wherein the selected volume of the custom beverage may be dispensed when the QR code is read by the reader of the beverage dispenser.

In any of the various embodiments described herein, receiving selection of the custom beverage may include receiving selection a carbonation level, a flavoring level, and a beverage temperature.

In any of the various embodiments described herein, receiving selection of the custom beverage may be performed at a location remote from the beverage dispenser.

In any of the various embodiments described herein, the method may further include tracking a hydration level of a consumer by tracking a total volume of custom beverages dispensed.

In any of the various embodiments described herein, the method may further include displaying in real-time a volume of the custom beverage dispensed during dispensing of the custom beverage.

In any of the various embodiments described herein, the method may further include tracking a total number of beverages dispensed by the beverage dispenser.

Some embodiments described herein relate to a method of dispensing a custom beverage using a beverage dispenser that includes reading a QR code of a beverage container by a reader of the beverage dispenser, wherein the QR code corresponds to the custom beverage and a volume of the custom beverage to be dispensed. The method may further include receiving the beverage container in a beverage container receiving area of the beverage dispenser, and dispensing automatically a volume of the custom beverage into the beverage container based on the QR code of the beverage container.

In any of the various embodiments described herein, the method may further include receiving a selection of the custom beverage in a user account on a mobile electronic device, and encoding the QR code of the beverage container with the selected custom beverage prior to reading the QR code of the beverage container by the reader of the beverage dispenser.

In any of the various embodiments described herein, the QR code may encode a beverage type and a flavoring of the custom beverage to be dispensed.

In any of the various embodiments described herein, the QR code may encode a carbonation level of the custom beverage to be dispensed.

Some embodiments described herein relate to a beverage dispenser for contactless operation that includes a housing, a display arranged on the housing and configured to display a QR code, wherein the QR code corresponds to a microsite for selecting a custom beverage and for generating a QR code that encodes information relating to the selected custom beverage. The beverage dispenser may further include a reader arranged on the housing and configured to read the QR code generated by the microsite, and a dispensing head arranged on the housing, wherein the dispensing head is configured to automatically dispense the selected custom beverage when the reader reads the QR code generated by the microsite.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

FIG. 14 shows an exemplary contactless method of dispensing a custom beverage according to an embodiment.

DETAILED DESCRIPTION

Figure 1:
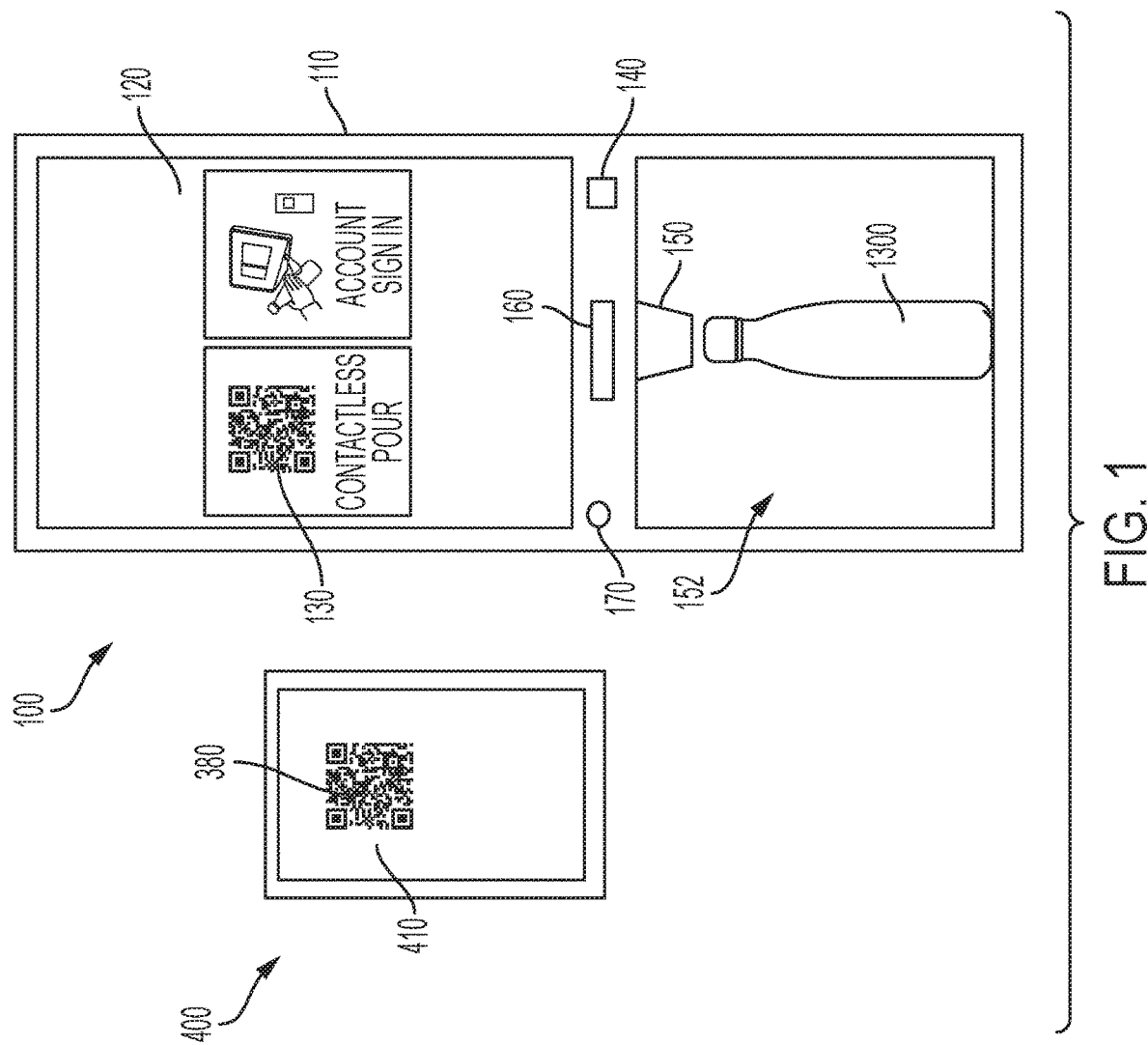
FIG. 1 shows a front perspective view of a contactless beverage dispenser according to an embodiment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

Beverage dispensers generally require a consumer to manually enter a beverage selection, such as by pressing a physical button or by touching a touch screen of the beverage dispenser. However, many consumers may use the beverage dispenser throughout the course of a day, and as a result the beverage dispenser may carry and spread germs among the various consumers that contact the beverage dispenser. Regularly cleaning the beverage dispenser may not be a practical option and does not completely address the problem since the beverage dispenser is unlikely to be cleaned after each use. Consumers may be less likely to use the beverage dispenser if they are concerned that operating the beverage dispenser may increase their risk of contracting an illness. In order to avoid the spread of germs, consumers may prefer to select and dispense a beverage without touching the beverage dispenser or the user interface of the beverage dispenser.

Consumers may also desire to dispense a beverage into a personal, reusable beverage container rather than a single-use container. Reusable beverage containers are increasing in popularity as consumers can personalize their beverage container by selecting the size, shape, color of the beverage container. Further, the consumers may prefer to use their own beverage container to ensure that the container is clean and sanitary. Additionally, many consumers are increasingly environmentally conscious and may prefer to avoid using single-use disposable containers. Allowing consumers to use their own container may also be desirable for the beverage dispenser operator, as the operator need not provide cups to the consumers.

Some embodiments described herein relate to a contactless method for selecting and dispensing a beverage in which the consumer selects a beverage and initiates dispensing of the selected beverage using either a microsite or a user account, which may be displayed on a mobile electronic device. In this way, the consumer may use his or her own personal mobile electronic device to select and dispense a beverage without having to physically contact the beverage dispenser. Some embodiments described herein relate to a contactless method for selecting and dispensing a beverage in which the consumer selects a volume of beverage to be dispensed such that the selected volume of beverage is automatically dispensed. In this way, a consumer may easily fill a beverage container with a beverage in a one-touch operation without the risk of overfilling the beverage container.

As used herein, the term "contactless" may refer to the ability to select and dispense a beverage without the consumer physically contacting a beverage dispenser, such as by touching a button or touch screen with the consumer's fingers.

An exemplary beverage dispenser 100 for contactless dispensing of a custom beverage is shown for example in FIG. 1. However, it is understood that methods of contactless dispensing of a beverage as described herein may be used with any of various beverage dispensers that are capable of reading a QR code and optionally displaying a QR code.

Beverage dispenser 100 may include a housing 110 that encloses components for dispensing beverages. In some embodiments, beverage dispenser 100 may be a table-top or counter-top beverage dispenser as shown in FIG. 1, or may be a free-standing beverage dispenser (see, e.g., FIG. 2). Beverage dispenser 100 may include a scanner or reader 140 arranged on housing 110 for reading a quick response (QR) code displayed by a consumer, such as a QR code 380 displayed on a display 410 of a mobile electronic device 400 or on a beverage container of the consumer. In some embodiments, reader 140 may include a camera.

In some embodiments, a QR code 380 encoding information about a custom beverage to be dispensed by beverage dispenser 100 may be generated via a user account, as discussed in further detail herein. For consumers that do not have a user account, beverage dispenser 100 may display a QR code that, when read by a consumer's mobile electronic device, launches a microsite for selecting a custom beverage and generating a QR code encoding information about the custom beverage. In this way, consumers may generate a QR code encoding information about a custom beverage via a user account or a microsite.

Mobile electronic device 400 may be for example a smartphone, a tablet, a smart watch, or the like. QR code 380 displayed by the consumer may correspond to a custom beverage selected by the consumer, such as via a microsite or user account, as described herein. When beverage dispenser 100 reads QR code 380, beverage dispenser 100 may automatically dispense the custom beverage based on QR code 380. In this way, the consumer may dispense a custom beverage in a contactless manner, without physically contacting beverage dispenser 100. While the present invention may refer primarily to QR codes, it is understood that other types of barcodes, markings, or indicia may be used to encode or store information.

In some embodiments, beverage dispenser 100 may include a digital display 120 arranged on housing 110. Digital display 120 may include a liquid crystal display (LCD), a light emitting diode (LED) display, an organic LED (OLED) display, a quantum dot LED (QLED) display, an electroluminescent display, a plasma display, or an electronic ink (e-ink) display, among others. In some embodiments, digital display 120 may be a touch screen display capable of receiving user input. Digital display 120 may display instructions and information about beverage selections and the status or progress of the beverage dispensing operation.

In some embodiments, digital display 120 may display a QR code 130. When QR code 130 of beverage dispenser 100 is scanned by mobile electronic device 400, such as by a camera of mobile electronic device 400, QR code 130 may cause a microsite for selecting and dispensing a custom beverage to be launched on mobile electronic device 400. QR code 130 may encode beverage selections available at beverage dispenser 100, such as available beverage types, beverage flavorings, and available modifications, such as carbonation level, flavoring level, and beverage temperature. As beverage dispensers may not all have the same available options and features, QR code for different beverage dispensers may indicate only the available beverage selection options at that beverage dispenser. Further, if beverage dispenser 100 is out of a particular flavoring, a microsite corresponding to QR code 130 may indicate that the flavoring is unavailable or may not display the unavailable flavoring at all. However, in some embodiments, QR code 130 of beverage dispenser 100 may be printed on housing 110, such as on a sticker or label. In such embodiments, if the selected custom beverage contains one or more beverage options that are unavailable, beverage dispenser 100 may not dispense the selected custom beverage and may indicate to the consumer that one or more beverage selection options are unavailable.

Housing 110 may define a beverage container receiving area 152 for receiving a beverage container 1300 to be filled by beverage dispenser 100. Beverage container receiving area 152 may be arranged below digital display 120. One or more beverage dispensing nozzles 150 may be arranged at an upper end of beverage container receiving area 152 such that a beverage may be dispensed into an open upper end of beverage container 1300. In some embodiments, beverage dispensing nozzle 150 may be a post-mix nozzle. In some embodiments, beverage dispenser 100 may be configured to bottom fill beverage container 1300. In such embodiments, beverage container 1300 may be capable of receiving a beverage via an opening or valve in a lower end of beverage container 1300.

Beverage dispenser 100 may further include a proximity sensor 170 for detecting a presence of a consumer. Proximity sensor 170 may detect a consumer within a predetermined distance of beverage dispenser 100. When beverage dispenser 100 is not in use by a consumer, digital display 120 may attract customers by playing a video or showing images, such as promotional images or advertisements. When proximity sensor 170 detects a presence of a consumer, digital display 120 may show instructions for beginning a dispensing operation and a QR code 130 to be scanned by a mobile electronic device 400 of the consumer.

Figure 7:
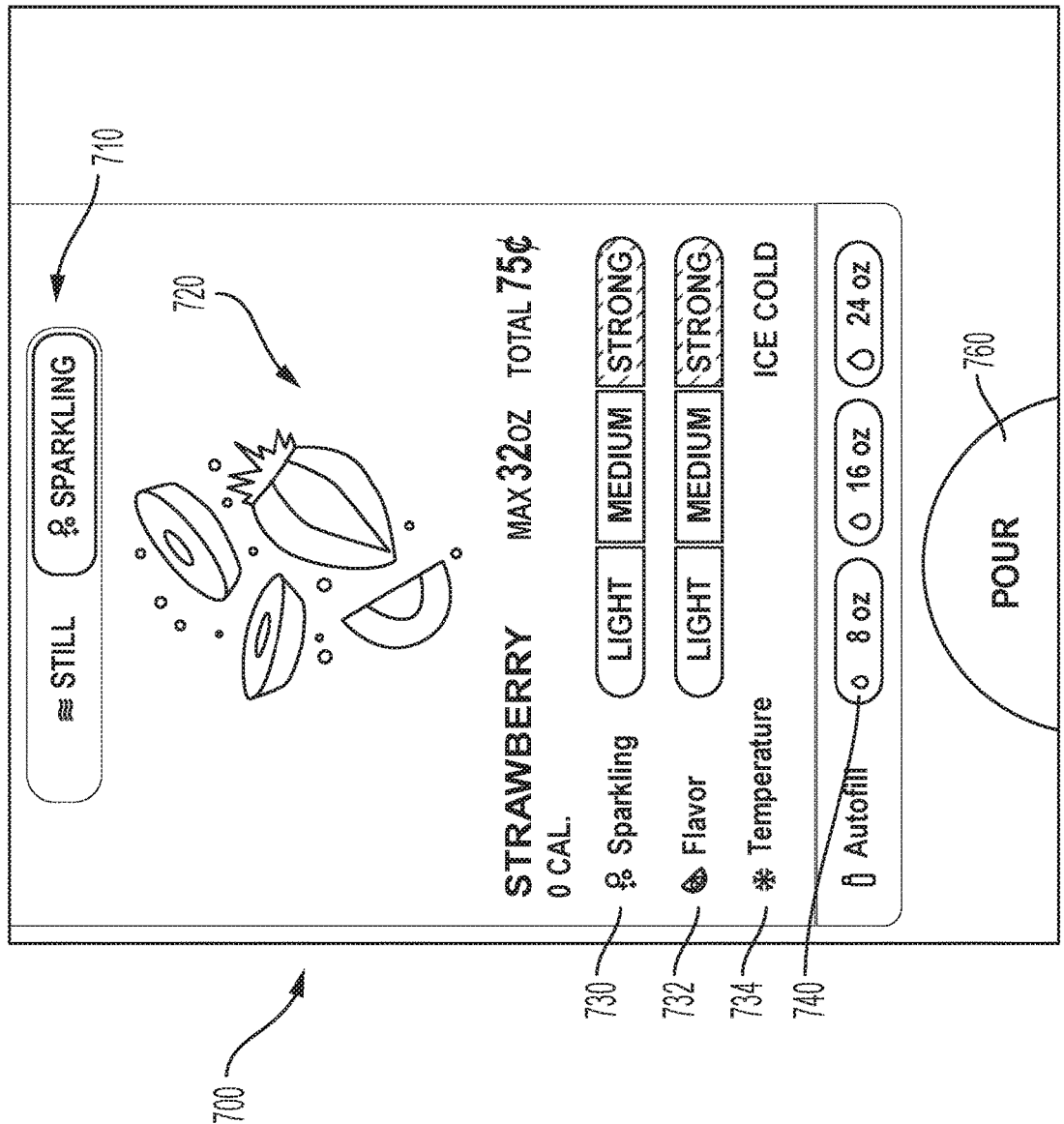
FIG. 7 shows a view of a graphical user interface of a beverage dispenser during dispensing of a custom beverage according to an embodiment.

While beverage dispenser 100 may be used by a consumer to select, purchase and dispense a beverage in a contactless manner. In some embodiments, beverage dispenser 100 may also be configured for operation by the consumer physically touching a user interface. For example, display 120 may be a touch screen display and the consumer may use his or her hand to operate display 120 (see, e.g., FIG. 7). This may provide convenience to consumers by providing the consumer with options for how to interact with the beverage dispenser. Further, some consumer may wish to use beverage dispenser 100 but may not have a mobile electronic device 400.

Beverage dispenser 100 may include a payment processing unit 160 for receiving a payment from a consumer. For example, payment processing unit 160 may be a slot for receiving paper money, coins or tokens, a card reader for reading a credit card, debit card, gift card or the like. Payment processing unit 160 may include a near field communication antenna or RFID reader for receiving a tap-and-go payment. Payment processing unit 160 may communicate with mobile electronic device 400 to receive a mobile payment, among other payment methods.

Beverage dispenser 100 may include various components for dispensing a beverage, including vessels for storing a beverage, vessels for storing flavorings, or connections to a source of a beverage or a source of flavoring, pumps for moving a beverage and flavorings to dispensing nozzle 150, valves for controlling fluid flow, and the like. Beverage dispenser 100 may include a carbonator configured to adjust a level of carbonation of a beverage. In this way, beverage dispenser 100 may dispense a beverage with a selectable level of carbonation. Beverage dispenser 100 may include a metering device configured to allow for dispensing of a selected amount of a flavoring. Beverage dispenser 100 may further include a chiller configured to cool the beverage and/or flavoring to a predetermined temperature or to a predetermined range of temperatures. Beverage dispenser 100 may include a control unit for controlling operation of the beverage dispenser, and control unit may include a memory for storing an executable beverage dispensing program, and a processor for controlling operation of components of beverage dispenser 100 such as pumps, metering elements, valves, and dispensing nozzles 150.

Figure 2:
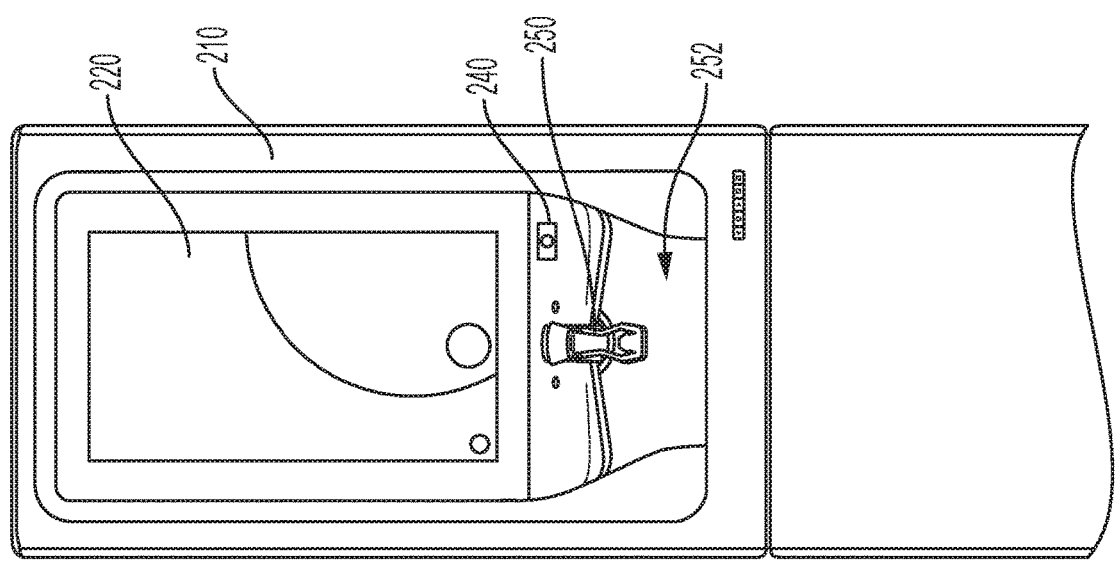
FIG. 2 shows a front perspective view of a contactless beverage dispenser according to an embodiment.

A beverage dispenser 200 having a different configuration than beverage dispenser 100 is shown for example in FIG. 2. Beverage dispenser 200 may have the same features and functions as described above with respect to beverage dispenser 100. Beverage dispenser 200 may be a free-standing or stand-alone beverage dispenser. Beverage dispenser 200 may include a housing 210 that encloses components for dispensing beverages as described above. Beverage dispenser 200 may include a reader 240 arranged on housing 210 for reading a QR code displayed by a consumer, such as a QR code on a mobile electronic device. In some embodiments, reader 140 may include a camera.

A digital display 220 may be arranged on housing 210 and may display instructions for a dispensing operation, selectable options, and information on the status or progress of the dispensing operation. Digital display 220 may further display a QR code corresponding to a microsite for selecting and dispensing a custom beverage via beverage dispenser 200. Housing 210 may define a beverage container receiving area 252 for receiving a beverage container to be filled by beverage dispenser 200. Beverage container receiving area 252 may be arranged below digital display 220. One or more beverage dispensing nozzles 250 may be arranged at an upper end of beverage container receiving area 252 such that a beverage may be dispensed into an open upper end of a beverage container.

Figure 3:
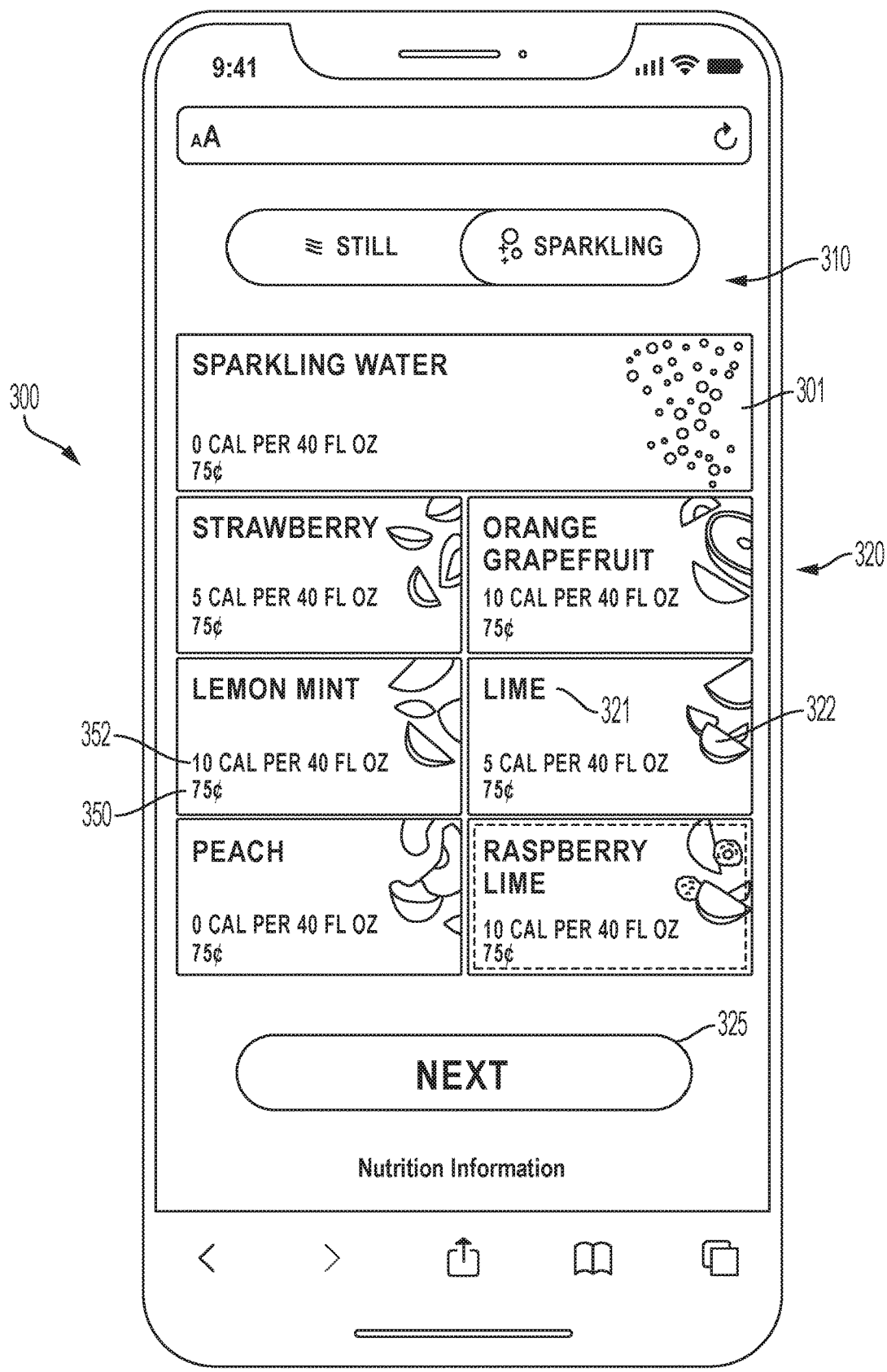
FIG. 3 shows a view of a webpage of a microsite for selecting a custom beverage according to an embodiment.

In some embodiments, a beverage dispenser such as beverage dispenser 100, 200 may display a QR code 130 that corresponds to a microsite 300 for selecting a custom beverage to be dispensed via beverage dispenser 100, as shown in FIG. 3. While it is understood that beverage dispenser 100, 200 may be used, among other beverage dispensers, the present application will refer primarily to beverage dispenser 100 for simplicity. QR code 130 for a particular beverage dispenser may include information about the beverage options available at that beverage dispenser such that the microsite 300 presents beverage options available at the beverage dispenser on which QR code 130 is displayed. A consumer may scan QR code 130 of beverage dispenser 100 with a mobile electronic device 400, and when QR code 130 is scanned, microsite 300 is launched automatically, or mobile electronic device 400 may display a link to microsite 300 that the consumer may select to launch microsite 300.

Microsite 300 may include a webpage or a cluster of webpages for selecting and dispensing a custom beverage via beverage dispenser 100. Microsite 300 or each page thereof may include instructions for selecting and dispensing a custom beverage, and selectable options for selecting and dispensing a custom beverage.

The consumer may make beverage selections to create a custom beverage using mobile electronic device 400, such as by operating a touch screen 410 of mobile electronic device 400. The consumer may touch the portion of touch screen 410 corresponding to the selectable option of microsite 300. In some embodiments, the consumer may alternatively make selection using a keypad, touchpad, mouse, keyboard, or the like.

In some embodiments, microsite 300 may provide a series of selections for creating a custom beverage as shown in FIG. 3. A first webpage 301 of microsite 300 may include selection of a beverage type 310, such as still water or sparkling water. Microsite 300 may include selection of a flavoring 320, such as strawberry, peach, or lime, among various other flavorings. The consumer may also opt to select no flavoring. In some embodiments, microsite 300 may include a name of the flavoring 321, an image of the flavoring 322, or both. For example, if the flavoring is strawberry, microsite 300 may display the text, "strawberry" and may include an image of a strawberry or strawberries. In some embodiments, a price 350 may be displayed for each beverage option. The price may be a price per oz. or may be a total price of the beverage to be dispensed based on the consumer's selections. In some embodiments, nutrition information 352 may be shown for each beverage option. In some embodiments, first webpage 301 may display a "Next" icon 325 that the consumer may select to proceed to a second webpage 302 of microsite 300 having additional options for customizing the beverage.

Figure 4:
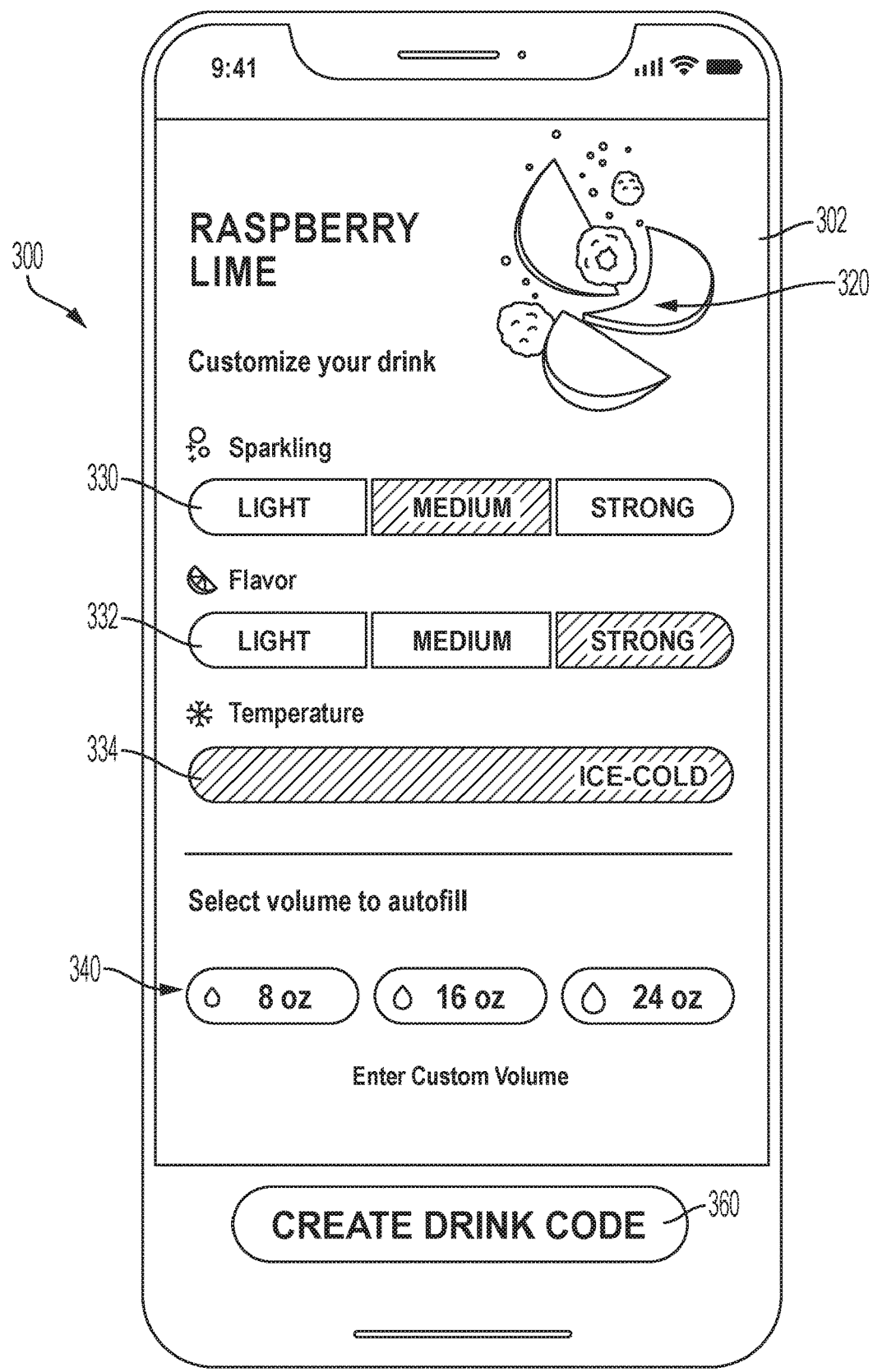
FIG. 4 shows a view of a webpage of a microsite for selecting a custom beverage according to an embodiment.

In some embodiments, second webpage 302 may include additional beverage selection options, as shown in FIG. 4. Second webpage 302 may display the selected flavoring 320 for the consumer's reference. Second webpage 302 may include additional beverage selections, such as a level of carbonation 330, such as low or light carbonation, medium carbonation, or high or strong carbonation. When a flavoring has been selected, the beverage selection may include a selection of a level or amount of the flavoring 332, such as light, medium, or strong flavoring. The beverage selection may include a temperature 334 of the beverage to be dispensed. The temperature may be provided in specific increments, e.g., 40° F., or may be provided qualitatively, e.g., as ice cold, chilled, or ambient. The consumer may be unable to generate a QR code until a selection is made, or in some embodiments if the consumer does not make a selection, microsite 300 may select default values, such as medium carbonation, medium flavoring, and chilled temperature. In some embodiments, microsite 300 may include a volume selection 340 so that the consumer may select the volume of the selected beverage to be dispensed. For example, the consumer may select to dispense 8 oz, 16 oz or 20 oz. Second webpage 302 may include a "create drink code" icon 360 for generating a QR code.

It is understood that the webpages 301, 302 are exemplary and the beverage selections may be arranged in fewer or additional webpages and the beverage selections may be presented in different orders and arrangements.

Once the beverage selection is complete, the consumer may use microsite 300 and select icon 360 to generate a QR code 380 that corresponds to the consumer's beverage selection. The generated QR code 380 may be displayed on a display 410 of mobile electronic device 400 (see, e.g., FIG. 1). The consumer may then scan QR code 380 generated by microsite and displayed on mobile electronic device 400 via a reader 140 of beverage dispenser 100. Beverage dispenser 100 may automatically dispense the custom beverage and the volume of the custom beverage based on the QR code 380. Manually pouring a volume of a custom beverage may result in overfilling the beverage container, particularly if the beverage container is opaque making it hard for the consumer to view the beverage level within the container. Automatically filling the beverage container with a selected volume of the custom beverage may help to avoid overfilling the beverage container. Beverage dispenser 100 may continuously pour the selected volume of the beverage, or beverage dispenser 100 may pause during pouring to allow time for the head or foam to settle to prevent overflowing of the beverage container. In some embodiments, beverage dispenser 100 may be configured to dispense the beverage in a series of bursts until the selected volume has been dispensed.

Figure 5:
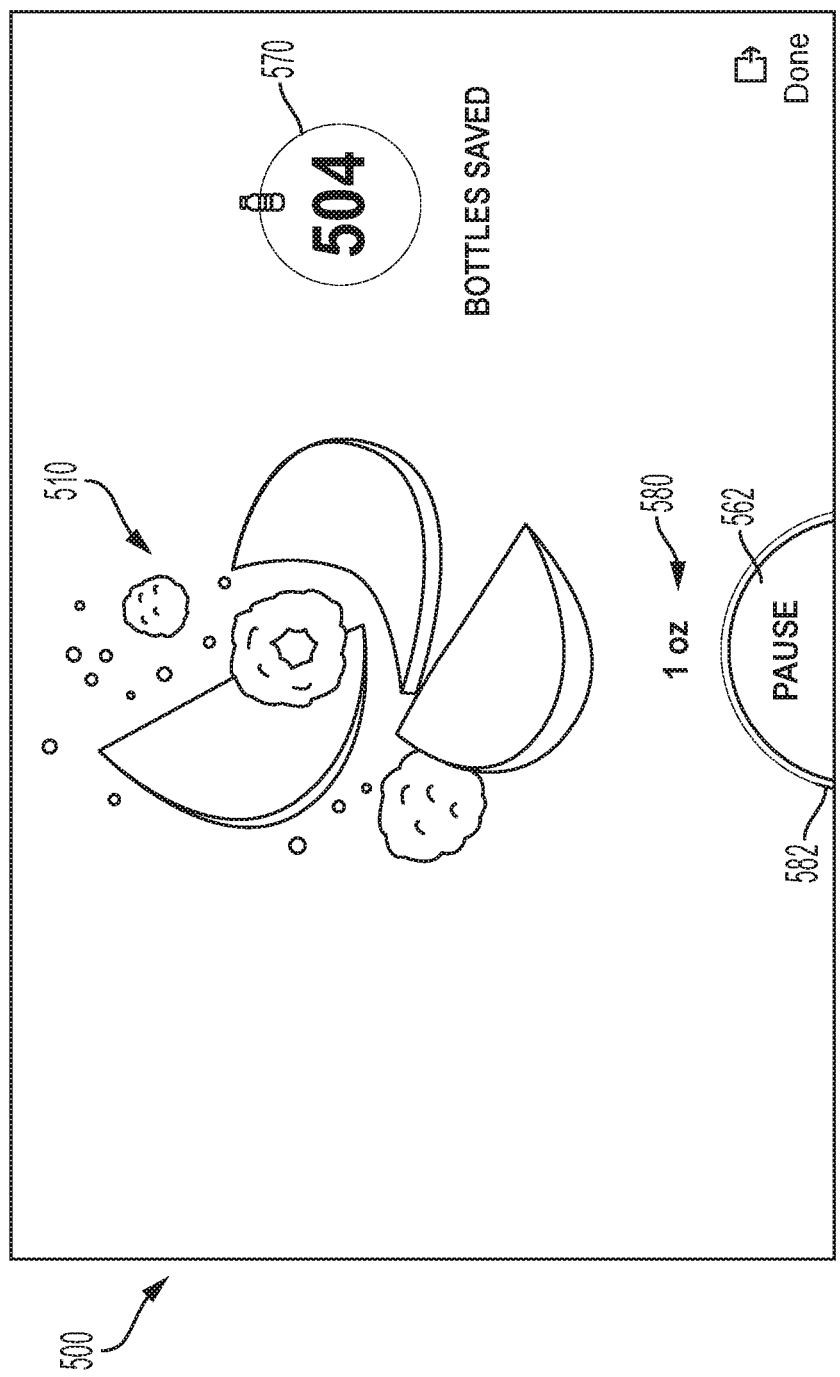
FIG. 5 shows a view of a graphical user interface of a beverage dispenser displayed during dispensing of a custom beverage according to an embodiment.

After beverage dispenser 100 reads QR code 380, digital display 120 of beverage dispenser 100 may display a graphic user interface (GUI) 500 showing information about the beverage dispensing operation, as shown in FIG. 5. During dispensing, GUI 500 may display a volume counter 580. Volume counter 580 may indicate the volume of beverage dispensed at any given time during the dispensing of the beverage. For example, volume counter 580 may start at 0 as the beverage is dispensed, volume counter 580 may incrementally increase to the total amount of beverage dispensed. In this way, volume counter 580 may update in real time to show the current volume of beverage dispensed. Alternatively or additionally, a progress bar 582 may be displayed during dispensing and may fill to indicate the progress of the dispensing, with progress bar 582 being completely filled when dispensing is complete.

In some embodiments, GUI 500 may include a "pause" icon 562 during dispensing. The consumer may select "pause" icon 562 to temporarily stop the beverage from being dispensed. When the total amount of beverage to be dispensed has been dispensed, the pause icon may change to a "pour" or "pour more" icon. The consumer may select the "pour more" icon to select an additional amount of beverage to be dispensed.

In some embodiments, GUI 500 may display a bottle counter 570. Bottle counter 570 may indicate a number of beverage containers filled using beverage dispenser 100, e.g., a number of 16 oz beverage containers filled. This number may represent the number of single-use disposable bottles saved by using the dispenser. Each time a beverage is dispensed, bottle counter 570 may increment by one. This may help to encourage consumers to utilize the beverage dispenser and a reusable container rather than utilizing single-use disposable containers by informing consumers of the impact of using beverage dispenser 100.

In some embodiments, display 410 of mobile electronic device 400 may display any of the same information displaying on digital display 120 of beverage dispenser 100 during dispensing of the custom beverage.

Figure 6:
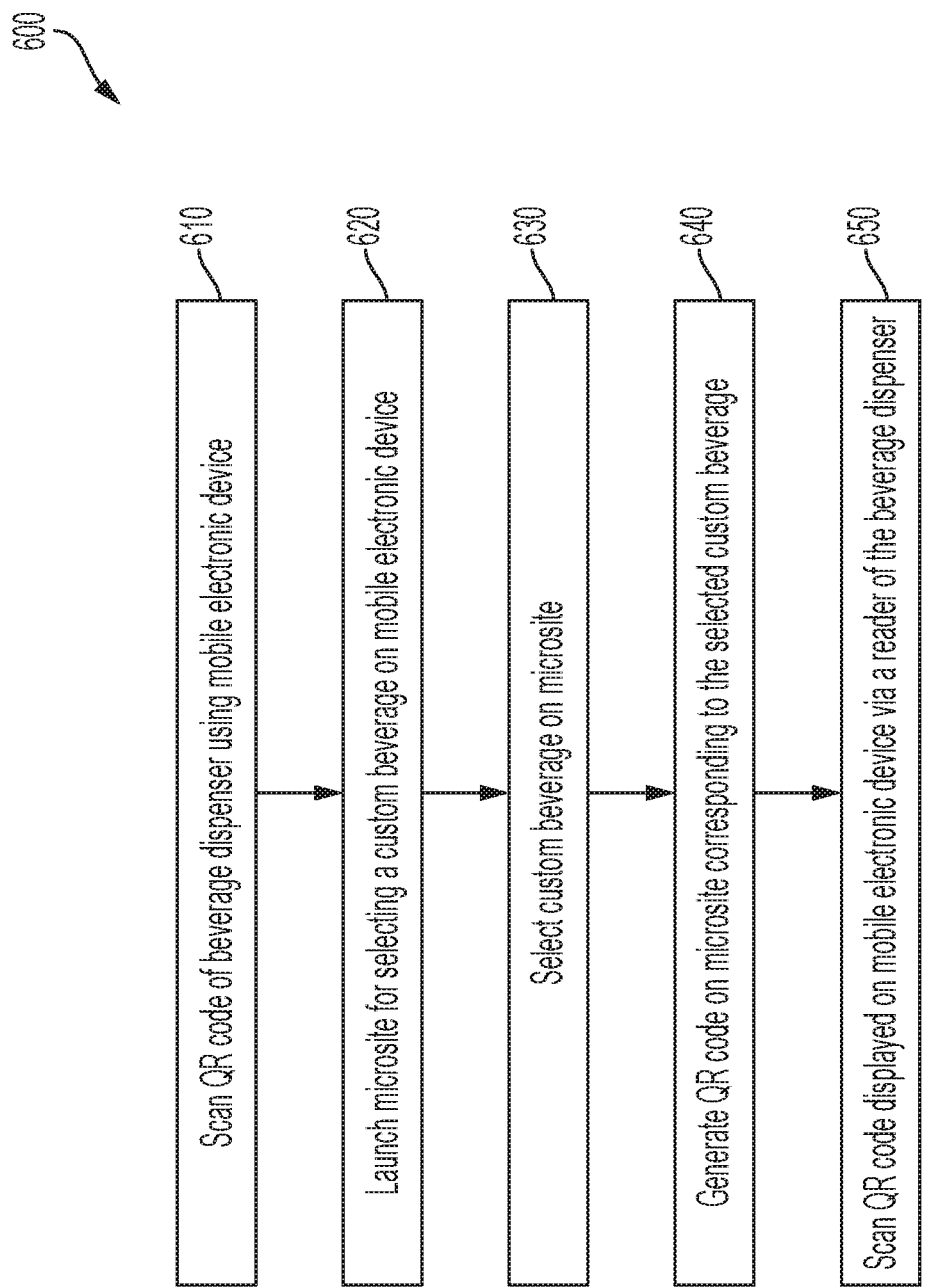
FIG. 6 shows an exemplary contactless method of dispensing a custom beverage according to an embodiment.

An exemplary method 600 of dispensing a beverage according to an embodiment is shown in FIG. 6. A consumer may scan a QR code of a beverage dispenser using a mobile electronic device 610. For example, a consumer may use a camera of a smartphone to read the QR code. Scanning the QR code may launch a microsite for a beverage dispensing operation on the mobile electronic device 620. The consumer may select a custom beverage using the microsite 630. The consumer may select a type of beverage, a flavoring, a carbonation level, a flavoring level, a beverage temperature, and a volume to be dispensed. Once the consumer selects the custom beverage, mobile electronic device may generate a QR code that encodes information about the custom beverage 640. The consumer may then scan the generated QR code 650 by a reader of a beverage dispenser so that the beverage dispenser dispenses the custom beverage based on the QR code.

In some embodiments, beverage dispenser 100 may be capable of use by operating a digital display 120 of beverage dispenser 100. Digital display 120 of beverage dispenser 100 may display the beverage selection options described above with respect to microsite 300. For example, digital display 120 may be a touch screen and consumer may use his or her hand to select the options on digital display 120. Digital display 120 may show a graphic user interface 700 that allows for selection of a beverage 710 and selection of a flavoring 720. Graphic user interface 700 may include additional options for customizing the beverage such as a carbonation level 730, a flavoring level 732, and a beverage temperature 734. Additionally, options may be provided for selecting a volume 740 of beverage to be dispensed. Price and nutrition information may also be displayed for the various beverage options. When the consumer has finished selecting the custom beverage, consumer may press a "pour" icon 760 to automatically dispense the selected custom beverage in the selected volume. Automatically dispensing the selected volume may help a consumer to fill an opaque beverage container without overflowing. Thus, a consumer may choose to use beverage dispenser 100 to dispense a beverage in a contactless manner or by manual operation of beverage dispenser 100 without a mobile electronic device.

Some embodiments described herein relate to a contactless method for dispensing a custom beverage that includes a user account. Similar to the method using the microsite, the consumer may use a mobile electronic device to select a custom beverage as discussed above. However, the consumer need not scan a QR code of a beverage dispenser to launch a microsite, and instead the consumer may access their user account using their mobile electronic device at any time and regardless of proximity to a beverage dispenser. When the consumer approaches the beverage dispenser, the consumer may simply access their user account on their mobile electronic device to generate and display a QR code, and scan the QR code at the beverage dispenser to dispense a pre-selected custom beverage.

A consumer may create a user account to select and store custom beverages, to enter and store payment information, and to store and track personal information, such as a target hydration level, among other information as discussed below. In some embodiments, the consumer account may be a software application executed on a mobile electronic device of the consumer.

Consumer may store payment information in user account, such as credit card or banking information so that payment may be automatically provided via the user account when the consumer purchases a beverage. In this way, the consumer need not provide payment at the time of the dispensing operation, such as by inserting cash or swiping a credit card. In some embodiments, user account may include a subscription based payment method. In some embodiments, user account may be a pre-paid account in which the consumer may add money to the user account prior to purchasing a beverage. When a beverage is purchased, the cost of the beverage may be deducted from the account balance.

Figure 8:
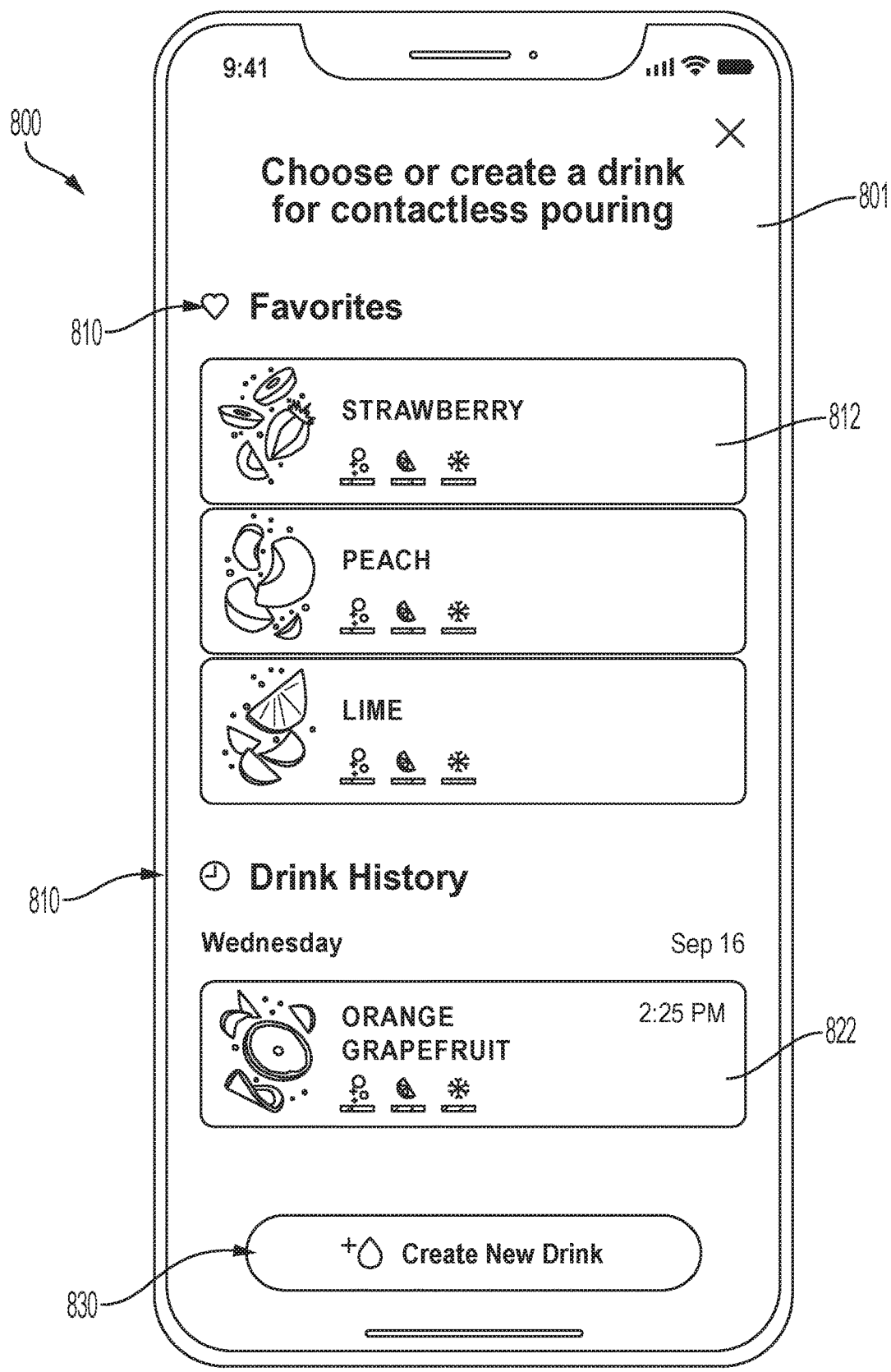
FIG. 8 shows a page of graphical user interface of a user account for selecting and dispensing a custom beverage according to an embodiment.

In some embodiments, the user account may include a graphical user interface (GUI) 800, as shown for example in FIG. 8. When the consumer chooses to create a custom beverage 830, GUI 800 may display the same beverage selection options as described above with respect to microsite 300. For example, GUI 800 may display options for selection of a beverage type and flavoring, and may display options for further customizing the beverage, such as selecting a carbonation level, flavoring level, and beverage temperature, as discussed above. The consumer may also select a volume of the beverage to be dispensed. The consumer may access user account to create and store custom beverages. The user may create and store a custom beverage at any time and in any location, including at locations remote from the beverage dispenser. By "remote" it is meant that the consumer need not be in proximity to a beverage dispenser and need not interact with a beverage dispenser in order to access the user account.

In contrast to microsite 300, GUI 800 of the user account may store the selected custom beverages, as shown in FIG. 8. A first page 801 of GUI 800 may display a stored custom beverage list 810 of custom beverages 812, also referred to as "favorite" beverages list, and alternatively or additionally a drink history 820 of previously dispensed custom beverages 822. Drink history 820 may display a set number of dispensed beverages, such as the most recent three beverages dispensed, or may include a list of all beverage dispensed. Drink history 820 may display the previously dispensed beverages in chronological order, with the most recently dispensed custom beverage displayed first or at the top of the list. In this way, when the consumer wishes to dispense a custom beverage, the consumer can access his or her user account and select a custom beverage from the list of stored custom beverage list 810 or from the drink history 820.

Figure 9:
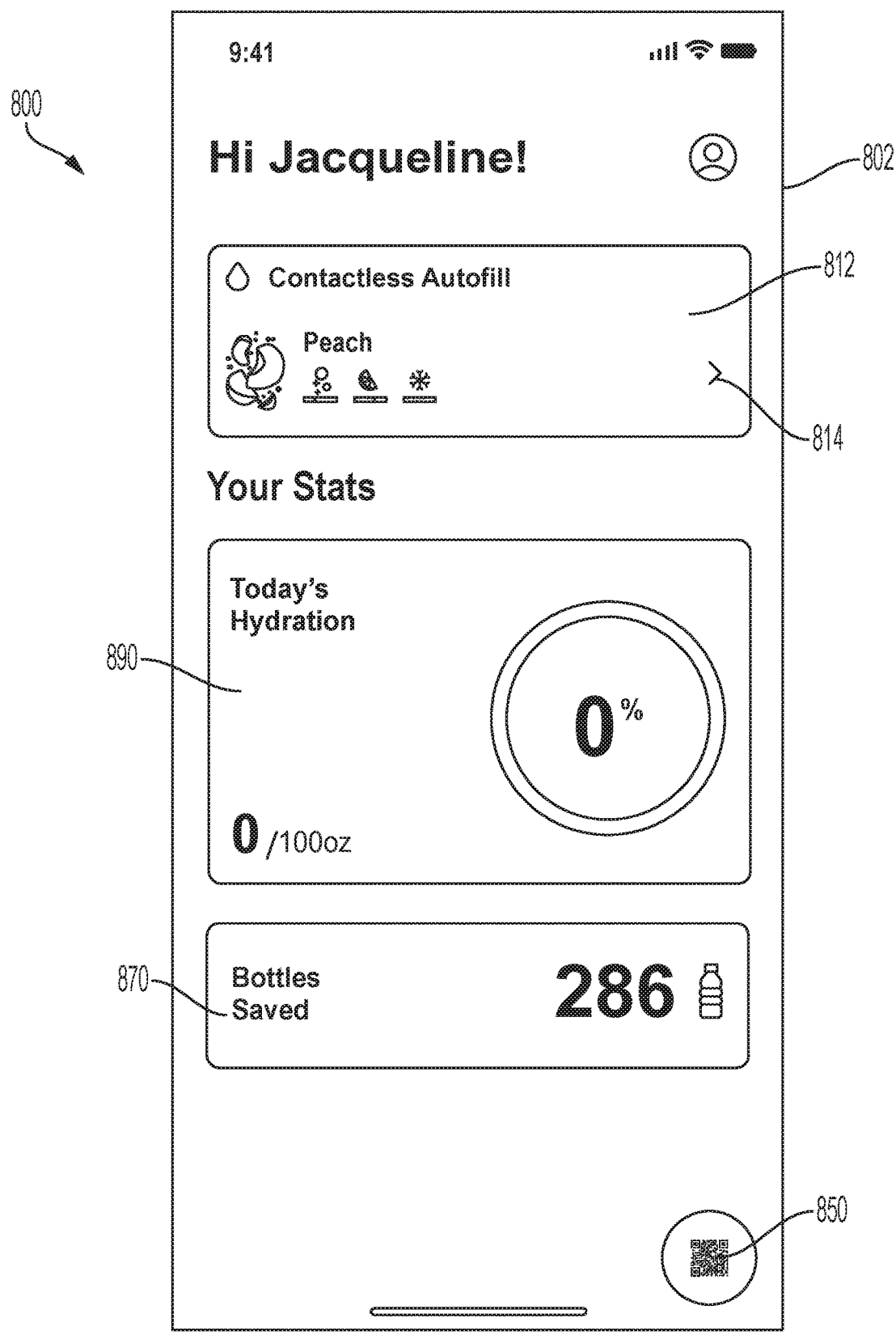
FIG. 9 shows a page of graphical user interface of a user account for selecting and dispensing a custom beverage according to an embodiment.

The user account may include a main page 802 that may display one or more stored custom beverages 812, and optionally a hydration tracker 890 and bottle counter 870 as shown in FIG. 9. Once the consumer selects a custom beverage, the consumer may store the custom beverage for quick access in main page 802. The stored custom beverage 812 may include a name of the beverage and/or an image of the beverage or beverage flavoring. An icon for the stored custom beverage 812 may indicate the selected customizations, such as the carbonation level, flavoring level, and beverage temperature. The stored custom beverage 812 may further include nutrition information, such as an amount of calories, an amount of sugar, or the like. The stored custom beverage 812 may further include cost information, such as the cost per oz or the total cost of the custom beverage. If the consumer wishes to select a new custom beverage or modify the custom beverage, consumer may select to expand 814 the stored custom beverage, which may return the consumer to page 801.

In some embodiments, user account may be used to track a hydration level of the consumer, and main page 802 of GUI 800 may include a hydration tracker 890. Consumers may use the user account to set a goal to consume a certain volume of a beverage, such as water, each day, or the user account may automatically select or suggest a target daily hydration level (e.g., 100 oz). The quantity of beverage dispensed is known based on the consumer's beverage selections, and the user account may be updated to reflect the quantity of beverage dispensed and thus consumed to help the consumer track their hydration level. This may also encourage consumers to utilize the beverage dispenser. For example, if the daily hydration goal is 64 oz and the first beverage dispensed has a volume of 16 oz, then the hydration goal may update to show that the consumer has consumed 16 oz of 64 oz, or 25% of their daily hydration goal. If a second beverage is then dispensed that is also 16 oz, the hydration tracker may update to show that 32 oz of 64 oz, or 50% of the hydration goal has been achieved.

In some embodiments, main page 802 of GUI 800 may indicate a bottle counter 870 that tracks a total number of beverages dispensed by the consumer and thus the number of single-use beverage containers the consumer has saved. Upon dispensing a custom beverage, the user account may update to increment the bottle saved counter by one. Bottle counter 870 may increment when a predetermined volume has been poured, e.g., when 16 oz has been poured.

Figure 10:
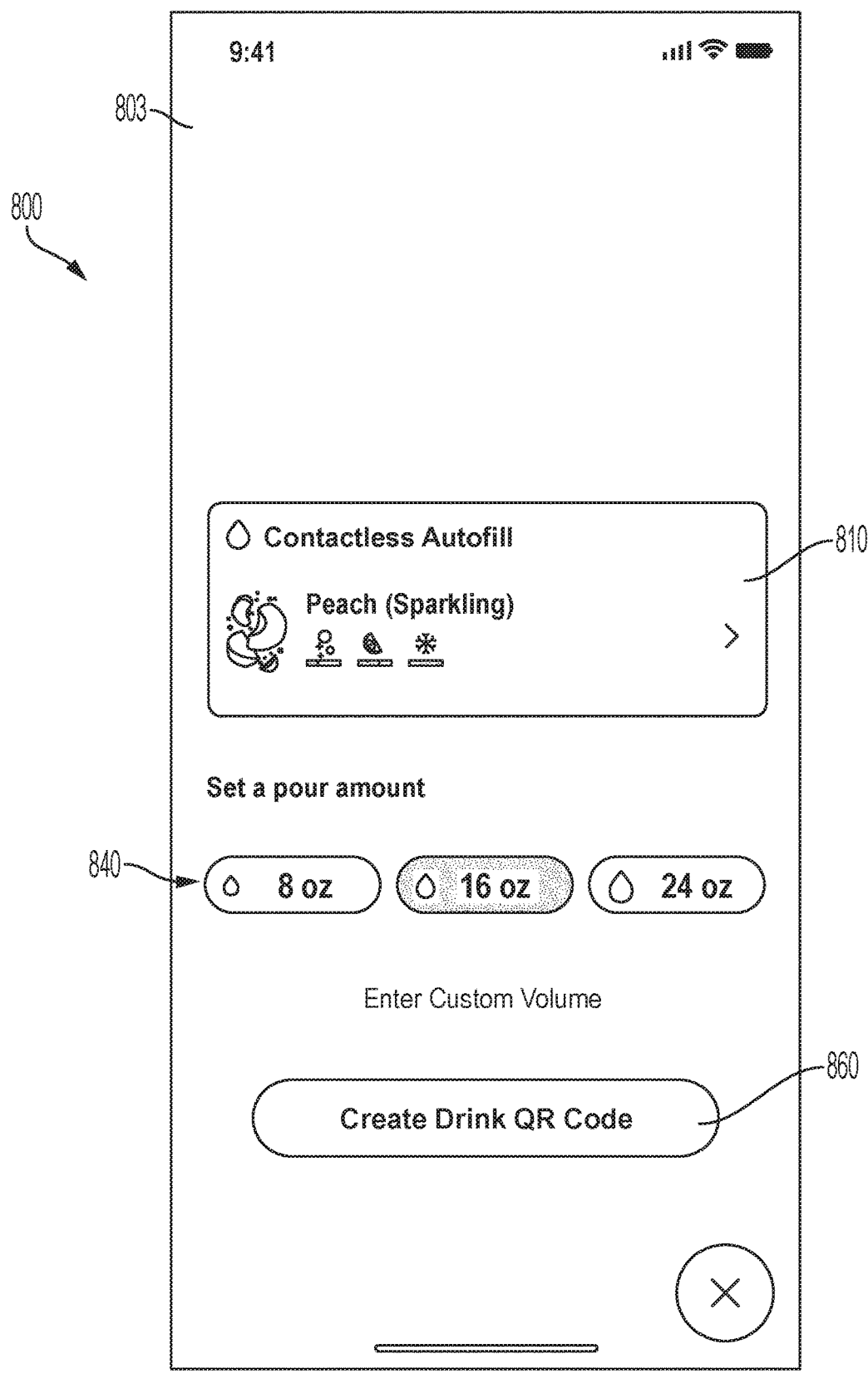
FIG. 10 shows a page of graphical user interface of a user account for selecting and dispensing a custom beverage according to an embodiment.

Using the user account, when the consumer wishes to purchase and dispense the custom beverage, the consumer may select a QR code icon 850 to proceed to a code generation page 803 of the user account, as shown in FIG. 10. In some embodiments, code generation page 803 of GUI 800 may display the selected custom beverage for dispensing and an option for selecting a beverage volume 840 to be dispensed. Having selected a stored custom beverage 812 and beverage volume 840 to be dispensed, the consumer may generate a QR code by selecting a "generate code" icon 860. The QR code may be displayed by the consumer, such as via a mobile electronic device, and the consumer may scan the QR code by a reader 140 of a beverage dispenser 100 (see e.g., FIG. 1) to initiate dispensing of the custom beverage based on the QR code.

In some embodiments, consumer may use the user account to set a volume of beverage to be dispensed. This selection may correspond to the volume of the consumer's beverage container, such as a reusable bottle. The consumer may save the volume selection so that in subsequent beverage orders the consumer is not prompted to select a volume of the beverage to be dispensed, simplifying the custom beverage selection process. However, in the event the consumer wishes to use different beverage containers, change their personal beverage container, or simply to dispense a different quantity of beverage, the consumer may use the user account to select a different volume of beverage to be dispensed.

Figure 11:
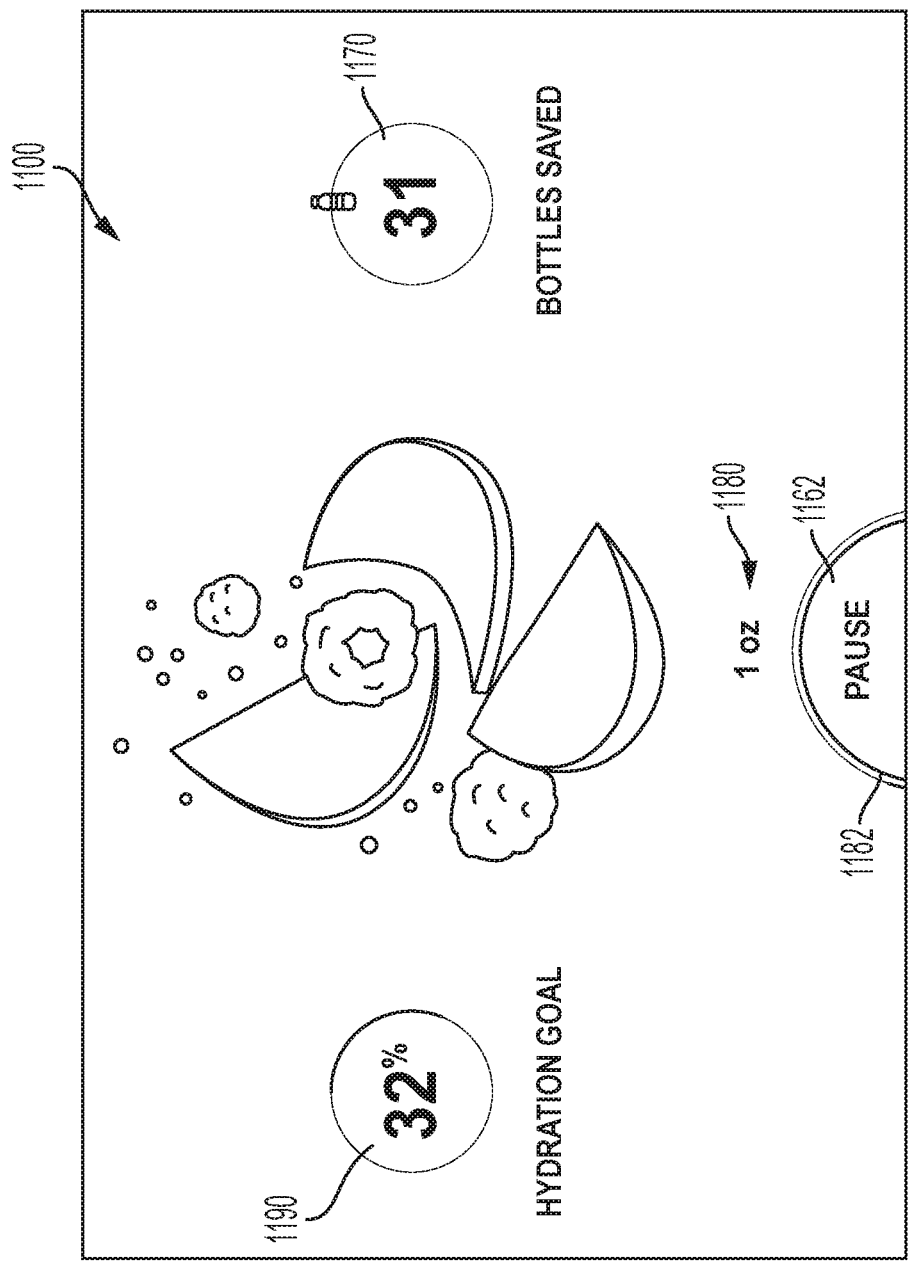
FIG. 11 shows a view of a graphical user interface of a beverage dispenser during dispensing of a custom beverage according to an embodiment.

Once the consumer scans the QR code displayed on the mobile electronic device at a beverage dispenser, a digital display 120 of beverage dispenser 100 (see, e.g., FIG. 1) may display a graphical user interface (GUI) 1100, as shown in FIG. 11. GUI 1100 may be similar to GUI 500 of FIG. 5. GUI 1100 may display a volume of beverage dispensed 1180 in real-time, a progress bar 1182 or both. Further, GUI 1100 may display a bottle counter 1170. A pause icon 1162 may be displayed that allows the consumer to temporarily pause dispensing of the custom beverage. In contrast to GUI 500, GUI 1100 may further display information from the user account, such as a hydration tracker 1090 to help the consumer track his or her hydration level. In some embodiments, display of mobile electronic device may display the same information as in GUI 1100 of digital display 120 of beverage dispenser 100 during dispensing of the custom beverage.

Once the custom beverage has been dispensed by the beverage dispenser, the user account may automatically update the bottle counter 870 by one, and may update the hydration tracker 890 to reflect the volume of beverage dispensed. Further, a drink history 820 may update to list the custom beverage dispensed.

It is understood that pages 801, 802, 803 of GUI 800 of user account are exemplary, and the information and beverage selection options may be presented in fewer or additional pages, and the information and beverage selection options may be arranged in different orders and arrangements.

Figure 12:
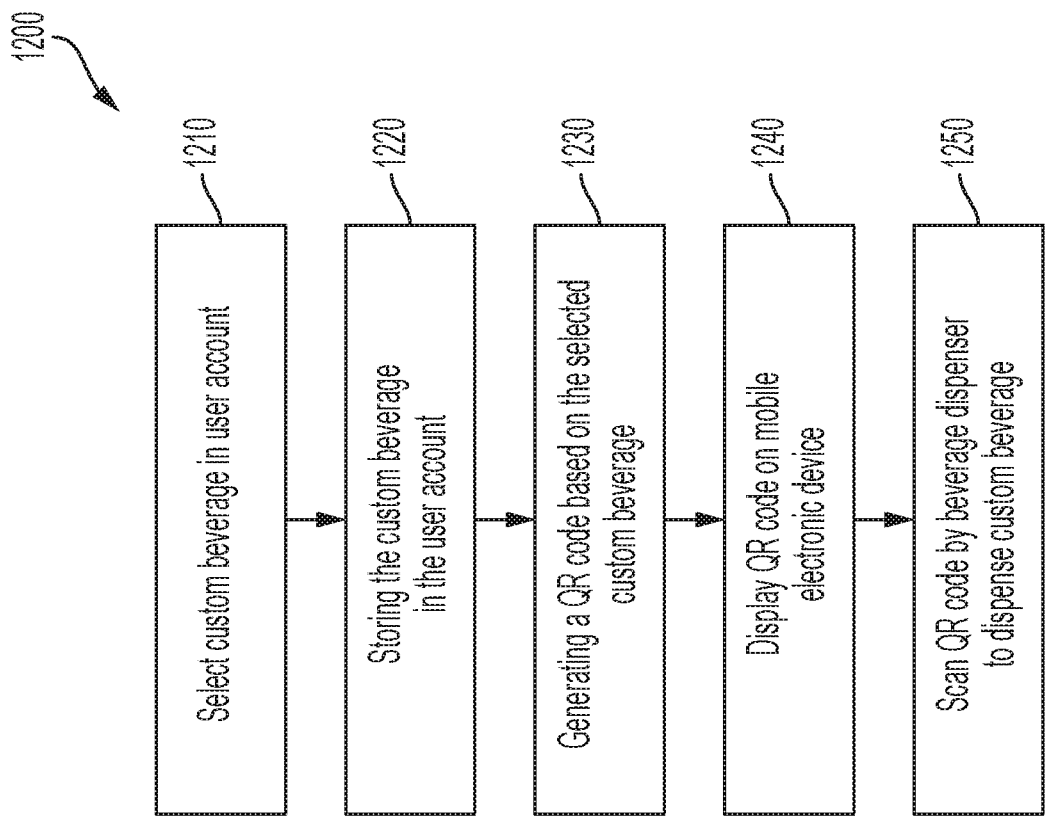
FIG. 12 shows an exemplary contactless method of dispensing a custom beverage according to an embodiment.

An exemplary method of selecting and dispensing a custom beverage 1200 according to an embodiment is shown in FIG. 12. A consumer may open a user account on a mobile electronic device and select a custom beverage in the user account 1210. The selected custom beverage may be stored in the user account 1220. When the consumer wishes to purchase and dispense the custom beverage, the consumer may use the user account to generate a QR code that corresponds to the custom beverage 1230. The QR code may be displayed on the display of the mobile electronic device 1240. The consumer may scan the QR code at the beverage dispenser to dispense the custom beverage 1250. In this way, when the consumer interacts with a beverage dispenser, the consumer may simply select a stored custom beverage in their user account, generate a QR code corresponding to the custom beverage, and scan the QR code at the beverage dispenser to dispense the custom beverage. The consumer need not make a series of selections to select the custom beverage while at the beverage dispenser and may simply select the stored custom beverage in the user account and generate a QR code.

Figure 13:
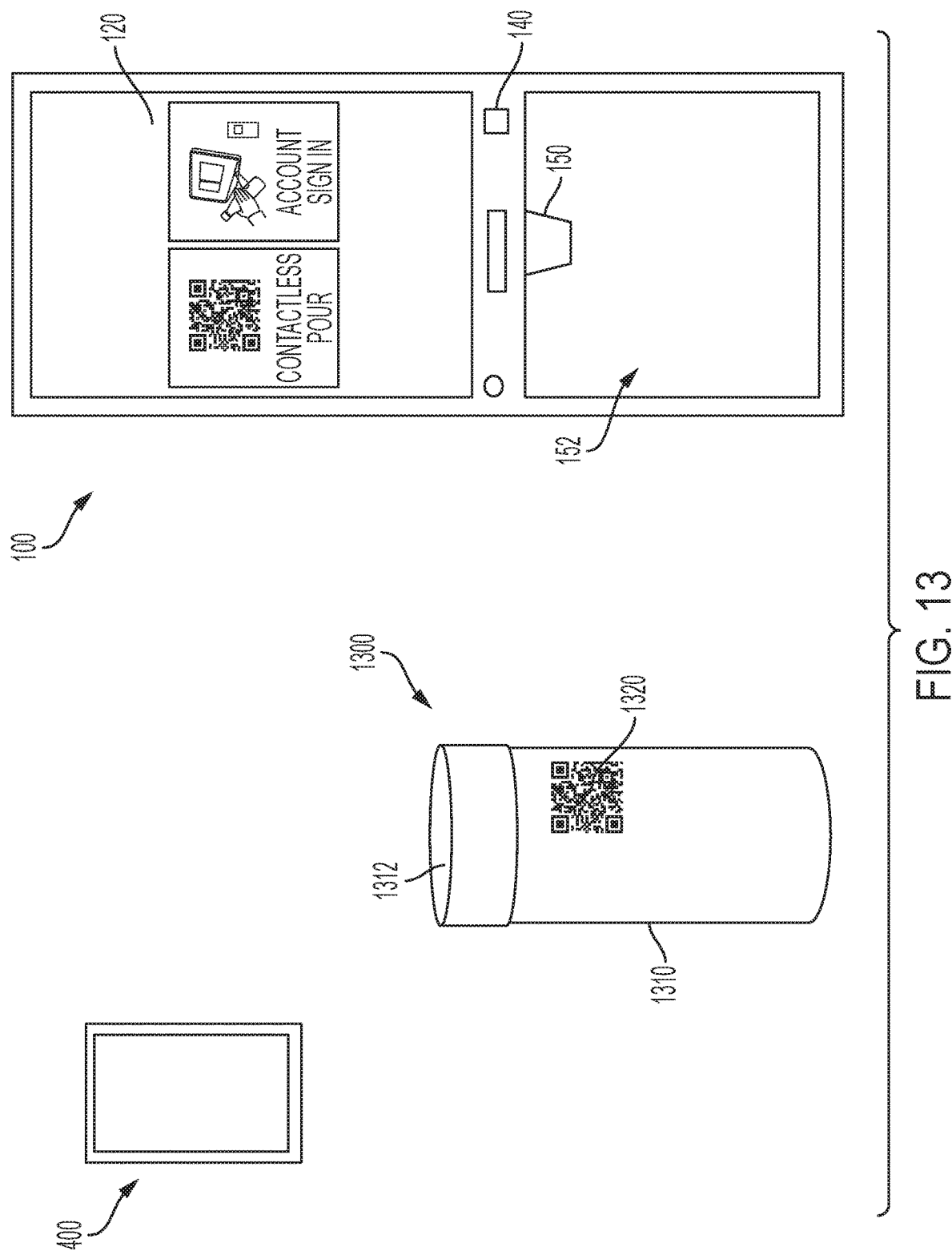
FIG. 13 shows a diagram of a beverage container for use with a beverage dispenser for contactless dispensing of a custom beverage according to an embodiment.

In some embodiments, a personal beverage container 1300 may include one or more QR codes 1320 configured to be read by a reader 140 of a beverage dispenser 100, as shown in FIG. 13. Personal beverage container 1300 may be reusable container, such as a water bottle, a sports bottle, a mug, or a thermos, among other reusable containers. Beverage container 1300 may include a body 1310 defining an interior volume for storing a beverage, and a lid 1312 removably covering an opening of body 1310. QR code 1320 may be arranged on body 1310 or on lid 1312 of beverage container 1300. Beverage container 1300 may be thermally insulated, and may have a double walled construction. Beverage container 1300 may be made of plastic, glass, or a metal, such as stainless steel, or a combination thereof.

The consumer may use the user account to select and store custom beverages as described herein. However, rather than using the user account to generate a QR code for display on the mobile electronic device 400, the consumer may use mobile electronic device 400, and particularly a camera of mobile electronic device 400, to scan a QR code 1320 of personal beverage container 1300 to encode QR code 1320 of personal beverage container 1300 with information regarding a selected custom beverage.

Once QR code 1320 is encoded with the custom beverage information, the consumer may approach a beverage dispenser 100 and scan QR code 1320 of personal beverage container 1300 via a reader 140 of beverage dispenser 100. Beverage dispenser 100 may then dispense the custom beverage encoded by QR code 1320. After scanning QR code 1320, the custom beverage may automatically be dispensed via dispensing nozzle 150 of beverage dispenser 100, and may be dispensed in the volume indicated by QR code 1320. In this way, the consumer can quickly and easily select, dispense and purchase a beverage in a contactless manner.

By including the QR code 1320 on personal beverage container 1300 to be filled, the consumer does not require the use of a mobile electronic device 400 at the time of the interaction with beverage dispenser 100. This may be beneficial as the consumer does not have to hold and manipulate both a mobile electronic device 400 and also a beverage container 1300 to be filled with the beverage at the same time. Further, the consumer's interaction with beverage dispenser 100 is simplified as the consumer is required only to scan QR code 1320 of the beverage container 1300 to cause dispensing of the custom beverage, and the consumer need not make a selection or provide a payment source when interacting with beverage dispenser 100.

An exemplary method of selecting and dispensing a custom beverage according to an embodiment is shown for example in FIG. 14. A consumer may select a custom beverage using a user account 1410. The consumer may scan a QR code of a beverage container with a mobile electronic device to encode the QR code with information about the selected custom beverage 1420. When the consumer wishes to purchase a beverage, the consumer may then scan the QR code of the beverage container via a reader of a beverage dispenser 1430. The beverage dispenser may then automatically dispense the custom beverage based on the QR code 1440.

Accordingly, a beverage dispenser and dispensing methods for dispensing a custom beverage in a contactless manner are provided for the convenience, health and safety of the consumers. The consumers may use a mobile electronic device to access a user account for selecting custom beverages and generating a QR code to be read by the beverage dispenser, or consumers may scan a QR code of the beverage dispenser to launch a microsite for selecting a custom beverage and generating a QR code to be read by the beverage dispenser. In this way, consumers can select and dispense custom beverages without physically contacting the beverage dispenser.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

What is claimed is:

1. A method of dispensing a custom beverage from a beverage dispenser in a contactless manner, the method comprising:
    displaying a QR code, by the beverage dispenser, wherein the QR code corresponds to a microsite for selecting a custom beverage;
    after a mobile device reads the QR code and accesses the microsite, receiving a selection of a custom beverage and a volume of the custom beverage to be dispensed via the microsite;
    generating, via the microsite, a QR code corresponding to the selected custom beverage and the selected volume;
    reading the generated QR code displayed on the mobile device by a reader of the beverage dispenser;
    displaying a pause icon on a user interface of the beverage dispenser, wherein the beverage dispenser is configured to pause dispensing of the beverage when the pause icon is selected; and
    dispensing the selected custom beverage in the selected volume based on the generated QR code.

2. The method of claim 1, wherein receiving the selection of the custom beverage comprises receiving a selection of a type of beverage and receiving a selection of a flavoring.

3. The method of claim 1, wherein receiving the selection of the custom beverage comprises receiving a selection of a carbonation level of the beverage.

4. The method of claim 1, wherein receiving the selection of the custom beverage comprises receiving a selection of a flavoring level of the beverage.

5. The method of claim 1, wherein receiving the selection of the custom beverage comprises receiving a selection of a temperature of the beverage.

6. The method of claim 1, further comprising displaying in real-time a volume of the custom beverage dispensed while the custom beverage is being dispensed by the beverage dispenser.

7. The method of claim 1, wherein dispensing the custom beverage occurs after a predetermined period of time after reading the generated QR code via the beverage dispenser.

8. The method of claim 1, comprising displaying the QR code, by the beverage dispenser, on the user interface of the beverage dispenser.

9. A method of selecting and dispensing a custom beverage using a mobile electronic device, the method comprising:
receiving selection of the custom beverage in a user account through a microsite, wherein receiving selection of the custom beverage comprises receiving selection of a first volume of beverage, receiving through a first page of the microsite, selection of a type of beverage, wherein the type of beverage comprises still water or carbonated water, and selection of a flavoring, and receiving, through a second page of the microsite, selection of a level for at least one of the selections received through the first page of the microsite;
storing the custom beverage in the user account;
generating a QR code corresponding to the stored custom beverage;
displaying the QR code on the mobile electronic device, wherein when the QR code is read by a reader of a beverage dispenser, the first volume of the custom beverage is dispensed by the beverage dispenser; and
receiving, through a graphical user interface of the beverage dispenser after dispensing the first volume of the custom beverage, a pour more command comprising a second volume of the custom beverage to be dispensed, and dispensing the second volume of the custom beverage after receiving the pour more command.

10. The method of claim 9, wherein receiving selection of the custom beverage comprises receiving selection of a carbonation level, a flavoring level, and a beverage temperature.

11. The method of claim 9, wherein receiving selection of the custom beverage is performed at a location remote from the beverage dispenser.

12. The method of claim 9, further comprising tracking a hydration level of a consumer by tracking a total volume of custom beverages dispensed.

13. The method of claim 9, further comprising displaying in real-time a volume of the custom beverage dispensed during dispensing of the custom beverage.

14. The method of claim 9, further comprising tracking a total number of beverages dispensed by the beverage dispenser.

15. The method of claim 9, comprising changing a pour icon to a pour more icon after dispensing the first volume.

16. A method of dispensing a custom beverage using a beverage dispenser, comprising:
receiving selection of a custom beverage in a user account through a microsite, wherein receiving selection of the custom beverage comprises receiving selection of a volume of beverage;
storing the custom beverage in the user account;
using a mobile electronic device to encode preexisting indicia on a beverage container with the custom beverage;
reading the encoded indicia on the beverage container by a reader of the beverage dispenser;
receiving the beverage container in a beverage container receiving area of the beverage dispenser;
displaying a pause icon on a user interface of the beverage dispenser, wherein the beverage dispenser is configured to pause dispensing of the beverage when the pause icon is selected; and
dispensing automatically the volume of the custom beverage into the beverage container based on the indicia on the beverage container.

17. The method of claim 16, further comprising:
receiving a selection of the custom beverage in a user account on a mobile electronic device.

18. The method of claim 16, wherein the indicia further encode a beverage type and a flavoring of the custom beverage to be dispensed.

19. The method of claim 16, wherein the indicia further encode a carbonation level of the custom beverage to be dispensed.

20. The method of claim 16, wherein the indicia comprise a first QR code, and the beverage container comprises a plurality of QR codes.

* * * * *